(12) United States Patent
Lange

(10) Patent No.: US 9,045,169 B2
(45) Date of Patent: Jun. 2, 2015

(54) REINFORCEMENT PART FOR A ROOF SIDE MEMBER

(71) Applicant: GM GLOBAL TECHNOLOGY OPERATIONS LLC, Detroit, MI (US)

(72) Inventor: Marcus Lange, Pfungstadt (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 13/773,386

(22) Filed: Feb. 21, 2013

(65) Prior Publication Data

US 2013/0234473 A1 Sep. 12, 2013

(30) Foreign Application Priority Data

Mar. 8, 2012 (DE) .......................... 10 2012 004 761

(51) Int. Cl.
*B62D 25/06* (2006.01)

(52) U.S. Cl.
CPC ...................................... *B62D 25/06* (2013.01)

(58) Field of Classification Search
CPC .............................. B62D 25/04; B62D 25/15
USPC ................. 296/203.01, 203.03, 205, 155, 30, 296/193.05, 193.06, 193.12, 202
See application file for complete search history.

(56) References Cited

U.S. PATENT DOCUMENTS

| 6,116,680 | A * | 9/2000 | Hunter et al. ............ 296/203.03 |
| 6,217,109 | B1 * | 4/2001 | Okana et al. ............ 296/203.03 |
| 6,322,135 | B1 * | 11/2001 | Okana et al. ............ 296/203.03 |
| 6,988,305 | B1 * | 1/2006 | Wilson .......................... 29/527.1 |
| 7,032,959 | B2 * | 4/2006 | Berstecher et al. ...... 296/193.05 |
| 2002/0030385 | A1 * | 3/2002 | Schwarz et al. ......... 296/203.03 |
| 2002/0190544 | A1 | 12/2002 | Yamamoto et al. |
| 2003/0018731 | A1 | 1/2003 | Watanabe et al. |
| 2003/0085593 | A1 * | 5/2003 | Shuto et al. ............. 296/203.01 |

FOREIGN PATENT DOCUMENTS

| DE | 10125985 A1 | 12/2002 |
| DE | 10228974 A1 | 1/2004 |
| DE | 102008018851 A1 | 10/2009 |
| EP | 1155941 A1 | 11/2001 |
| EP | 1512471 A2 | 3/2005 |
| GB | 2373486 A | 9/2002 |
| JP | 2001010533 A | 1/2001 |
| JP | 2011136623 A | 7/2011 |

OTHER PUBLICATIONS

German Patent Office, German Search Report for Application No. 102012004 761.4, dated Nov. 14, 2012.

* cited by examiner

*Primary Examiner* — Jason S Morrow
*Assistant Examiner* — E Turner Hicks
(74) *Attorney, Agent, or Firm* — Ingrassia Fisher & Lorenz PC

(57) ABSTRACT

A reinforcement part for a roof side member of a motor vehicle is provided. The reinforcement part is configured in one piece and includes a first cross section, a second cross section, and a third cross section. The first cross section steadily merges into the second cross section and the second cross section steadily merges into the third cross section. The first cross section, the second cross section and the third cross section vary in vehicle longitudinal direction. The first cross section, the second cross section and the third cross section have a steady contour on a circumference of the reinforcement part and are of a closed configuration.

9 Claims, 2 Drawing Sheets

REINFORCEMENT PART FOR A ROOF SIDE MEMBER

CROSS-REFERENCE TO RELATED APPLICATION

This application claims priority to German Patent Application No. 10 2012 004 761.4, filed Mar. 8, 2012, which is incorporated herein by reference in its entirety.

TECHNICAL FIELD

The technical field relates to a reinforcement part for a roof side member of a motor vehicle.

BACKGROUND

From DE 102 47 045 A1 a vehicle body structure has become known, wherein a roof side member comprises a reinforcement part. The reinforcement part has a closed profile and is arranged in a roof side member. The reinforcement part is fastened within a closed profile of the roof side member so as to reinforce the roof side member.

At least one object herein is to provide a light and sturdy roof side member.

SUMMARY

In accordance with an exemplary embodiment, a reinforcement part for a roof side member of a motor vehicle is provided. The reinforcement part is configured in one piece and has cross sections that merge into one another and vary in vehicle longitudinal direction. The cross sections on the circumference have a steady contour and are of a closed design.

Changes in cross section are steady in longitudinal direction, i.e. free of edges and transitions with small radii, in an exemplary embodiment. The cross sections can be adapted to the respective adjoining components and have a contour of bulges and indentations that is steady and thus likewise free of edges and transitions with small radii. Small radii in this case is to mean radii smaller than two millimeters (2 mm) Through the one-piece configuration with cross sections which steadily merge into one another and a contour which is steady on the circumference, a homogenous flow of forces is created in the reinforcement part upon loading. Otherwise, a weakening of the reinforcement part can occur on sharp radii and sudden changes of the contour through the so-called notch effect. Through the steady configuration, the reinforcement part can absorb relatively high forces, so that additional components providing the required sturdiness can be omitted. Because of this, a lighter roof side member can be installed.

In an embodiment, the reinforcement part is produced via an internal pressure method. Because of this, a closed-wall reinforcement part can be produced. The walls of reinforcement part have a substantially constant thickness and are completely closed on circumference. Through this configuration, a reinforcement part can be produced which is so sturdy that further panels and support elements increasing the sturdiness of the roof side member can be omitted. Because of this, a lighter and smaller roof side member can be produced while maintaining required strength values.

In an embodiment, the internal pressure method is a blow-forming method.

In the case of a blowforming method, a tubular part, from which the reinforcement part is created later on, is heated and placed into a tool negative. Following this, a pressurized gas is introduced so that the walls of the blank are forced against the tool negative. In the process, a high-strength reinforcement part is created. The tubular part can be produced from an oblong metal sheet, which for this purpose is bent over and welded such that it has a substantially circular cross section.

In another embodiment, the internal pressure method is a hydroforming method.

In the case of a hydroforming method, the blank is likewise placed into a tool negative. However, the blank is not necessarily heated and a liquid is used in order to press the wall of the blank against the tool negative.

In an embodiment, the reinforcement part on a vehicle extends from an A-pillar to a D-pillar.

Because of this, the reinforcement part can be sturdily anchored on the vehicle structure in that it is connected for example to a C-pillar and the D-pillar. Thus, the mentioned characteristics of the reinforcement part which increase the sturdiness also come to bear in the rear region of a motor vehicle, so that a potential component reduction and weight saving can also be accomplished here.

In an embodiment, a guide rail for a sliding door is arranged in a portion.

In the case of multiple part reinforcement parts, intermediate elements had to be provided previously as a rule, since the configuration of the reinforcement part had to satisfy aspects of the sturdiness. In an embodiment, the guide rail is largely designed straight and deflected towards the vehicle interior in a front portion, so that the sliding door is guided along the outside of the motor vehicle into the door portal or out of the latter.

On the roof side member, an inner panel can be arranged, on which a bulge for a portion of a guide rail for a sliding door protruding to the inside is provided, wherein the bulge protrudes into the vehicle interior and wherein the inner panel is of one piece.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the various embodiments or the application and uses thereof. Furthermore, there is no intention to be bound by any theory presented in the preceding background or the following detailed description.

Figure 1:
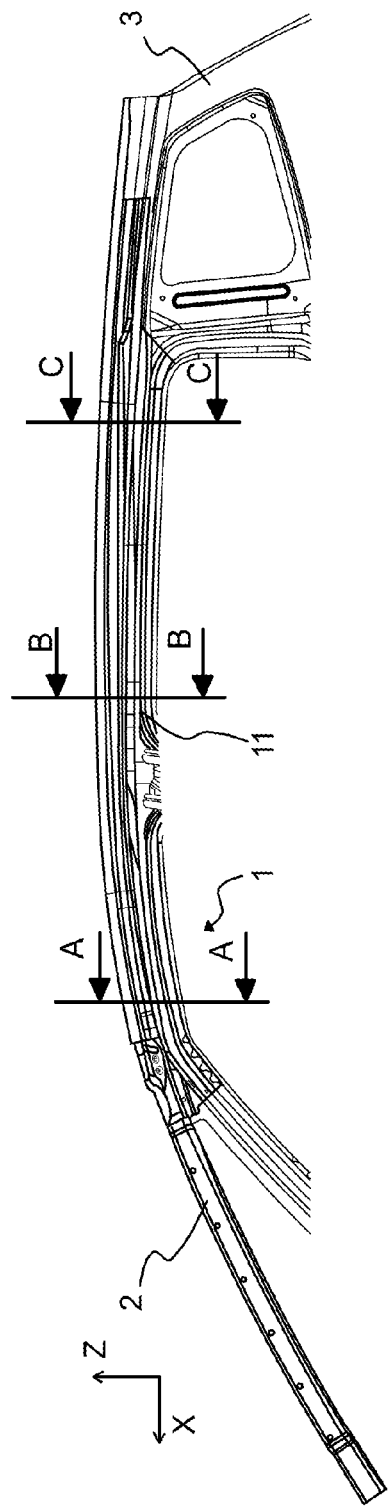
FIG. 1 is a cross-sectional view, from a lateral perspective, of a part of a motor vehicle having a roof side member, an A-pillar, a C-pillar and a D-pillar, in accordance with an exemplary embodiment.

FIG. 1 shows a roof side member 1 from a lateral perspective. The roof side member 1 forms a left outer edge of a vehicle roof In the event of a lateral impact, high forces act on the roof side member 1, such that it is configured in a suitably sturdy manner.

Figure 2:
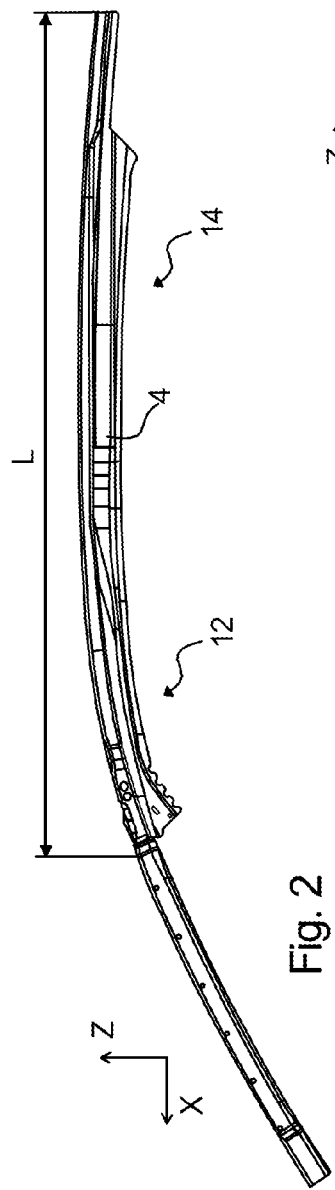
FIG. 2 is a cross-sectional view of the roof side member with a reinforcement part and the A-pillar attached thereto, in accordance with an exemplary embodiment.

For reaching the sturdiness, in an exemplary embodiment a reinforcement part 4 is arranged in the roof side member, which is shown in FIG. 2. The reinforcement part 4 stiffens the vehicle body in the roof region. The reinforcement part 4 is produced in one piece, i.e. from a single blank, which at the most can have a soldering or welding seam depending on the manufacturing process. When being formed into the reinforcement part 4, the blank is formed so severely and also heated if required, so that an almost closed metal structure is formed. Because of this, a flow of forces can form in the reinforcement part 4 during a loading, which occurs substantially free of notch effects and stresses on local pardoned regions, occurs homogenously and substantially evenly distributed on the reinforcement part 4. The reinforcement part 4 extends over the length L from the A-pillar to as far as the D-pillar 3 (see FIG. 1). Through the high load capacity of the reinforcement part 4, a D-pillar can be omitted if required. On a vehicle, the B-pillar forms a connection between a side sill and a roof side member and forms a rear end of a front door portal or a front end of a rear door portal. The reinforcement part 4 has variable cross sections over the vehicle longitudinal axis X, which are described in connection with the FIGS. 4 to 6. The cross sections steadily and seamlessly merge into one another.

Figure 3:
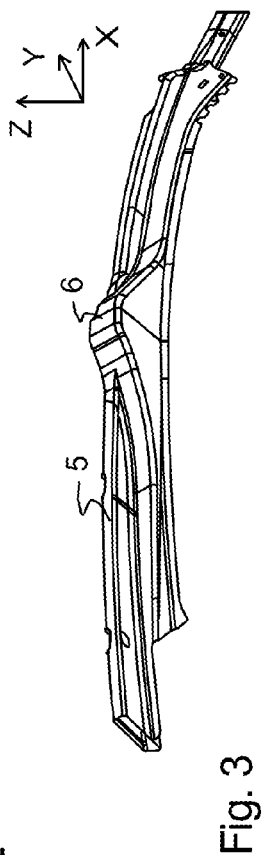
FIG. 3 is a cross-sectional view of an inner panel that can be arranged on an inside of the roof side member with a bulge, in accordance with an exemplary embodiment.
Figure 5:
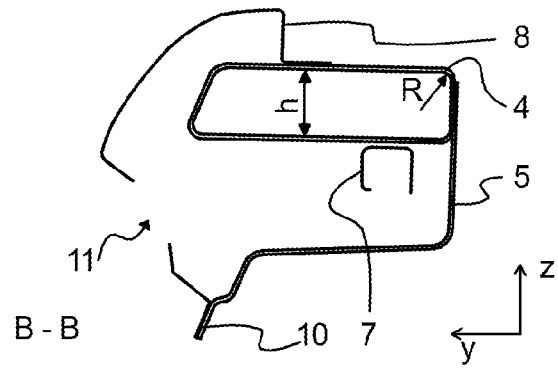
FIG. 5 is a cross-sectional view taken across axis B-B in FIG. 1.

From a vehicle interior perspective, FIG. 3 shows in an embodiment an inner panel 5 that can be attached to the roof side member or to the reinforcement part 4 on the inside, which has a bulge 6 for a portion of a guide rail protruding to the inside (see FIG. 5). The guide rail 7 serves for guiding a sliding door which is not shown in the Figures, wherein the bulge 6 protrudes into the vehicle interior.

Figure 4:
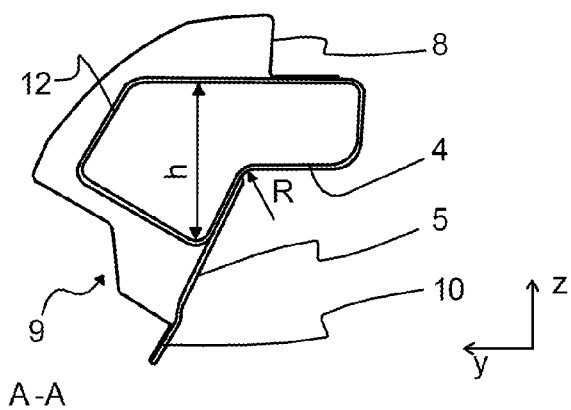
FIG. 4 is a cross-sectional view taken across axis A-A in FIG. 1.

FIG. 4 shows, in regions, a section through the region of the roof side member 1 marked "A" in FIG. 1. In an embodiment, on the reinforcement part 4 with the first cross section 13, an outer skin 8 is arranged, which represents a termination of the roof side member 1 towards the outside. The cross section 13 has a steadily variable contour, with radii R, which are dimensioned so that no notch effect can occur in the reinforcement part 4. The cross section 13 in its contour is adapted to the respective vehicle design. The outer skin 8 has a shoulder 9 for supporting a door seal which is not shown and it extends downwards as far as to a flange 10. On the flange 10, the outer skin 8 is connected to the inner panel 5. The connection in this case can be carried out via a spot welding method. On the flange 10, a door sealing flange which is not shown and which protects the flange 10 can be arranged in the assembled state.

In an embodiment, FIG. 5 shows a section through the region marked "B" in FIG. 1 that is started slightly offset to the back. It is evident that the reinforcement part 4 in the second cross section 15 is shaped differently, but completely closed on its circumference. Closed in this context means that there are no openings and slits on the circumference or on the perimeter, and also no weld seams introduced after the forming method. At the bottom of the reinforcement part 4, the guide rail 7 that was already mentioned previously is arranged. On it, an arm which is not shown of a sliding door which is likewise not shown can be guided. The guide rail 7 is arranged offset to the right, i.e. offset towards the vehicle interior in order to make possible moving the sliding door into the door portal in the immediate vicinity of the completely closed position. In the outer skin 8, an opening 11 for passing through the arm is provided.

Figure 6:
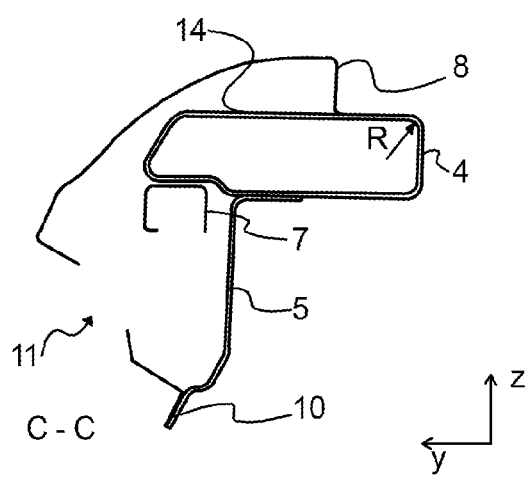
FIG. 6 is a cross-sectional view taken across axis C-C in FIG. 1.

FIG. 6 shows a section through the region marked "C" in FIG. 1. In an embodiment, the guide rail 7 is now arranged further to the left, i.e. spaced further from the vehicle interior than in the section shown in FIG. 5. The reinforcement part 4 in this region has a greater height h in the vehicle vertical axis Z than in the section shown in FIG. 5. Because of this, the moments of inertia of area, which constitute a dimension for the torsional stiffness and bending stiffness are kept as large as just permitted by the package and the installation space, wherein package is to mean the geometrical and functional of components and different equipment versions.

In an embodiment, the reinforcement part 4 can be produced according to the so-called blowforming method. Because of this, a seamless closed reinforcement part with cross sections that are variable over the length L can be produced. The strength of a component produced according to the blowforming method is relatively high. In another embodiment, forming according to the hydroforming method is likewise possible. Even if the Figure description related to the roof side member of a vehicle having a sliding door, the reinforcement part 4 can also be employed with a vehicle having conventional swing doors. Through the high strength values of the reinforcement part 4 that can be achieved, the B-pillar can even be omitted if required.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A roof side member of a motor vehicle, comprising:
a reinforcement part comprising
a first cross section;
a second cross section; and
a third cross section, wherein the first cross section steadily merges into the second cross section and the second cross section steadily merges into the third cross section, wherein the first cross section, the second cross section and the third cross section vary in vehicle longitudinal direction, and wherein the first cross section, the second cross section and the third cross section have a continuous contour on a circumference of the reinforcement part and are of a closed configuration;
a guide rail directly mounted on the reinforcement part for a sliding door; and
an inner panel that comprises a bulge for a portion of the guide rail of the sliding door protruding to the inside, wherein the bulge protrudes into the motor vehicle interior and wherein the inner panel is of one piece.

2. The roof side member according to claim 1, wherein the reinforcement part was produced according to an internal pressure method.

3. The roof side member according to claim 2, wherein the internal pressure method is a blowforming method.

4. The roof side member according to claim 2, wherein the internal pressure method is a hydroforming method.

5. The roof side member according to claim 1, wherein the reinforcement part extends on the motor vehicle from an A-pillar as far as to a D-pillar.

6. The roof side member of claim 1, wherein the guide rail has a total length, and wherein the guide rail is mounted to the reinforcement part along the total length.

7. The roof side member of claim 1, wherein the reinforcement part has an exterior side and an interior side, and
wherein, at a first position, the guide rail is mounted on the interior side of the reinforcement part and, at a second position, the guide rail is mounted on the exterior side of the reinforcement part.

8. The roof side member of claim 7, wherein the first position is at a B-pillar of the motor vehicle and the second potion is at the C-pillar of the motor vehicle.

9. A roof side member of a motor vehicle, comprising:
a reinforcement part comprising
a first cross section;
a second cross section; and
a third cross section, wherein the first cross section steadily merges into the second cross section and the second cross section steadily merges into the third cross section, wherein the first cross section, the second cross section and the third cross section vary in vehicle longitudinal direction, and wherein the first cross section, the second cross section and the third cross section have a continuous contour on a circumference of the reinforcement part and are of a closed configuration;
a guide rail mounted on the reinforcement part for a sliding door; and
an inner panel that comprises a bulge for a portion of the guide rail of the sliding door protruding to the inside, wherein the bulge protrudes into the motor vehicle interior and wherein the inner panel is of one piece,
wherein the reinforcement part at least partially extends through the bulge of the inner panel.

* * * * *